(12) United States Patent
Lalague

(10) Patent No.: US 10,696,187 B2
(45) Date of Patent: Jun. 30, 2020

(54) VEHICLE INTERIOR AND ASSOCIATED AUTONOMOUS OR SEMI-AUTONOMOUS VEHICLE

(71) Applicant: FAURECIA INTERIEUR INDUSTRIE, Nanterre (FR)

(72) Inventor: Philippe Lalague, Le Mesnil le Roi (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 71 days.

(21) Appl. No.: 15/965,669

(22) Filed: Apr. 27, 2018

(65) Prior Publication Data

US 2018/0312082 A1    Nov. 1, 2018

(30) Foreign Application Priority Data

Apr. 27, 2017   (FR) ...................... 17 53682

(51) Int. Cl.
*B60N 2/01*       (2006.01)
*B60R 21/02*      (2006.01)
*B60N 2/90*       (2018.01)

(52) U.S. Cl.
CPC ............... *B60N 2/01* (2013.01); *B60N 2/91* (2018.02); *B60R 21/026* (2013.01)

(58) Field of Classification Search
CPC ............ B60N 2/01; B60N 2/91; B60R 21/026
USPC ................................................. 296/24, 24.46
See application file for complete search history.

(56) References Cited

U.S. PATENT DOCUMENTS

| 6,286,882 B1 | 9/2001 | Rastetter | |
| 7,562,931 B2 * | 7/2009 | Stojanovic | B60N 2/3013 296/24.4 |
| 9,216,674 B1 * | 12/2015 | Garib | B60N 2/91 |
| 10,525,893 B2 * | 1/2020 | Lind | B60N 3/102 |
| 2014/0361585 A1 * | 12/2014 | Henshaw | B60N 2/01 297/174 R |
| 2017/0334313 A1 * | 11/2017 | Ahn | B60N 2/01 |
| 2018/0105273 A1 * | 4/2018 | Robinson | B64D 11/0605 |
| 2018/0354444 A1 * | 12/2018 | Sundararajan | B60R 21/20 |

FOREIGN PATENT DOCUMENTS

| DE | 19813670 C1 | 7/1999 |
| FR | 2933928 A1 | 1/2010 |

OTHER PUBLICATIONS

French Search Report for French application No. FR1753682, dated Jan. 10, 2018, 2 pages.

* cited by examiner

*Primary Examiner* — Pinel E Romain
(74) *Attorney, Agent, or Firm* — Reising Ethington P.C.

(57) ABSTRACT

A vehicle passenger compartment having at least three seating areas and at least one clear area, located between two adjacent seating areas, wherein the passenger compartment includes at least one separating panel movable between a first position in which the separating panel extends outside the clear area and a second position in which the separating panel extends in the clear area, so as to separate the two associated adjacent seating areas.

12 Claims, 4 Drawing Sheets

VEHICLE INTERIOR AND ASSOCIATED AUTONOMOUS OR SEMI-AUTONOMOUS VEHICLE

BACKGROUND OF THE INVENTION

Field of the Invention

The present invention relates to a vehicle passenger compartment, in particular of an automobile. The present invention in particular applies to an autonomous or semi-autonomous vehicle.

Description of Related Art

In this type of vehicle, there is no driver or a driver who only intervenes periodically during certain driving phases. In such vehicles, it is therefore possible to arrange the space of the passenger compartment differently due to the smaller number of constraints related to the driving of the vehicle.

For example, it is possible to place seats back to back or face-to-face. However, it is desirable in each of the seat arrangements to be able to preserve a certain level of privacy between the seated persons.

The positioning of separating partitions is not satisfactory, since such partitions are not incorporated in an aesthetically pleasing way into the passenger compartment. Furthermore, they clutter the passenger compartment and can make access to different seats difficult.

The invention aims to offset this drawback by proposing a passenger compartment with easier access and the possibility of ergonomically forming an isolated compartment for each passenger.

BRIEF SUMMARY OF THE INVENTION

To that end, the invention relates to a vehicle passenger compartment having at least three seating areas and at least one clear area, located between two adjacent seating areas, characterized in that the passenger compartment comprises at least one separating panel movable between a first position in which the separating panel extends outside the clear area and a second position in which the separating panel extends in the clear area, so as to separate the two associated adjacent seating areas.

Thus, when the separating panel is in the second position, which is a deployed position, it blocks, in an aesthetically pleasing way, the view of a passenger in a seating area toward the adjacent seating area. Such a position makes it possible to preserve privacy between two adjacent passengers. Furthermore, when the separating panel is in the first position, which is a retracted position, the separating panel is stored outside the clear areas, which makes the seats easier to access, favors communication between passengers and improves the ergonomics and design of the passenger compartment.

The passenger compartment according to the invention may comprise one or more of the following features, considered individually or according to all technically possible combinations:

the passenger compartment has at least two clear areas, each clear area being located between two adjacent seating areas, the passenger compartment comprising at least two separating panels, each separating panel being movable between a first position in which the separating panel extends outside each clear area and a second position in which the separating panel extends in at least one clear area, so as to separate the two associated adjacent seating areas;

the passenger compartment has a first side and a second side, separated by a longitudinal plane, and has a front row and a back row, separated by a transverse plane substantially perpendicular to the longitudinal plane, a first seating area being located on the first side in the front row, a second seating area being located on the first side in the back row, a third seating area being located on the second side in the front row, a fourth seating area being located on the second side in the back row, a first clear area extending between the first seating area and the second seating area, a second clear area extending between the second seating area and the fourth seating area and a third clear area extending between the third seating area and the fourth seating area;

the passenger compartment comprises a first seat arranged in a first seating area, and a second seat arranged in a second seating area, the first seat and the second seat being turned back to back relative to one another, the first seat and the second seat delimiting a receiving area between them, the separating panel being received in the receiving area in its first position;

the passenger compartment comprises a third seat arranged in a third seating area, and a fourth seat arranged in a fourth seating area, the third seat and the fourth seat facing one another, the separating panel extending, in its second position, in the clear area between the third seat and the fourth seat;

the passenger compartment comprises a center console, the center console extending between two adjacent seating areas, the center console defining at least one housing, the separating panel being received in the housing in its first position;

the passenger compartment has a first side and a second side, separated by a longitudinal plane, and has a front row and a back row, separated by a transverse plane substantially perpendicular to the longitudinal plane, the passenger compartment comprising another separating panel, the other separating panel being mounted translatable in the transverse plane in a deployment direction substantially perpendicular to the longitudinal plane, the other separated panel being mounted movably in the deployment direction between its first position and its second position;

the transverse plane extends on a rear side or on a front side of the center console;

the center console comprises a passage, the other the separating panel moving in the passage, between its first position and its second position;

the separating panel is translucent;

the separating panel comprises at least one screen.

The invention also relates to an autonomous or semi-autonomous vehicle comprising a passenger compartment as previously described.

BRIEF DESCRIPTION OF THE SEVERAL VIEWS OF THE DRAWINGS

Other features and advantages of the invention will emerge from the detailed description that follows, for information and in reference to the appended figures, in which.

DETAILED DESCRIPTION OF THE ILLUSTRATED EMBODIMENT

Hereinafter, the longitudinal and transverse directions and the terms "front", "back", "left" and "right" are defined relative to the usual directions of a motor vehicle.

"Substantially perpendicular" means perpendicular to within plus or minus 5°. "Substantially vertical" means vertical to within plus or minus 5°.

Figure 1:
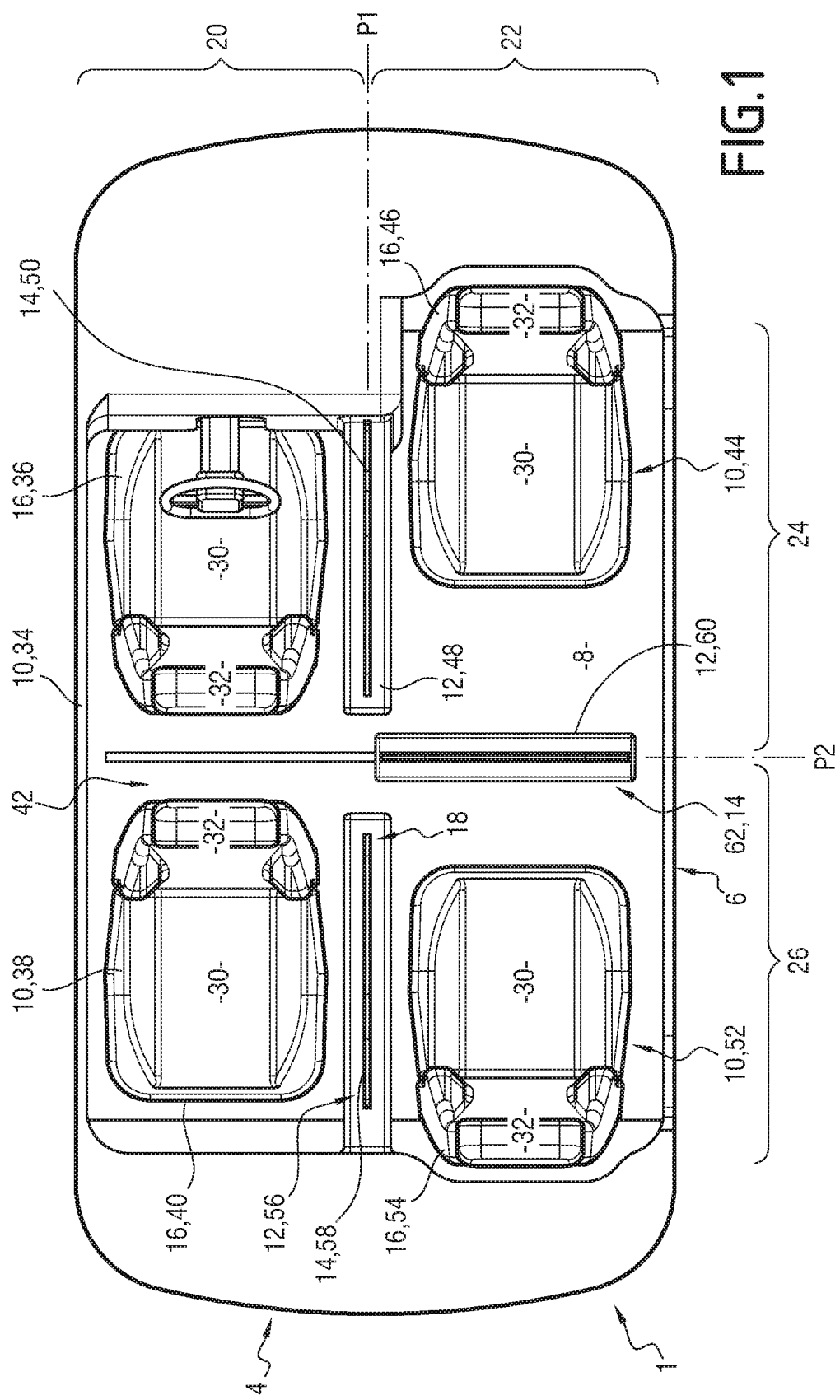
FIG. 1 is a schematic top illustration of a passenger compartment according to an embodiment of the invention, a separating panel being in the deployed position.
Figure 2:
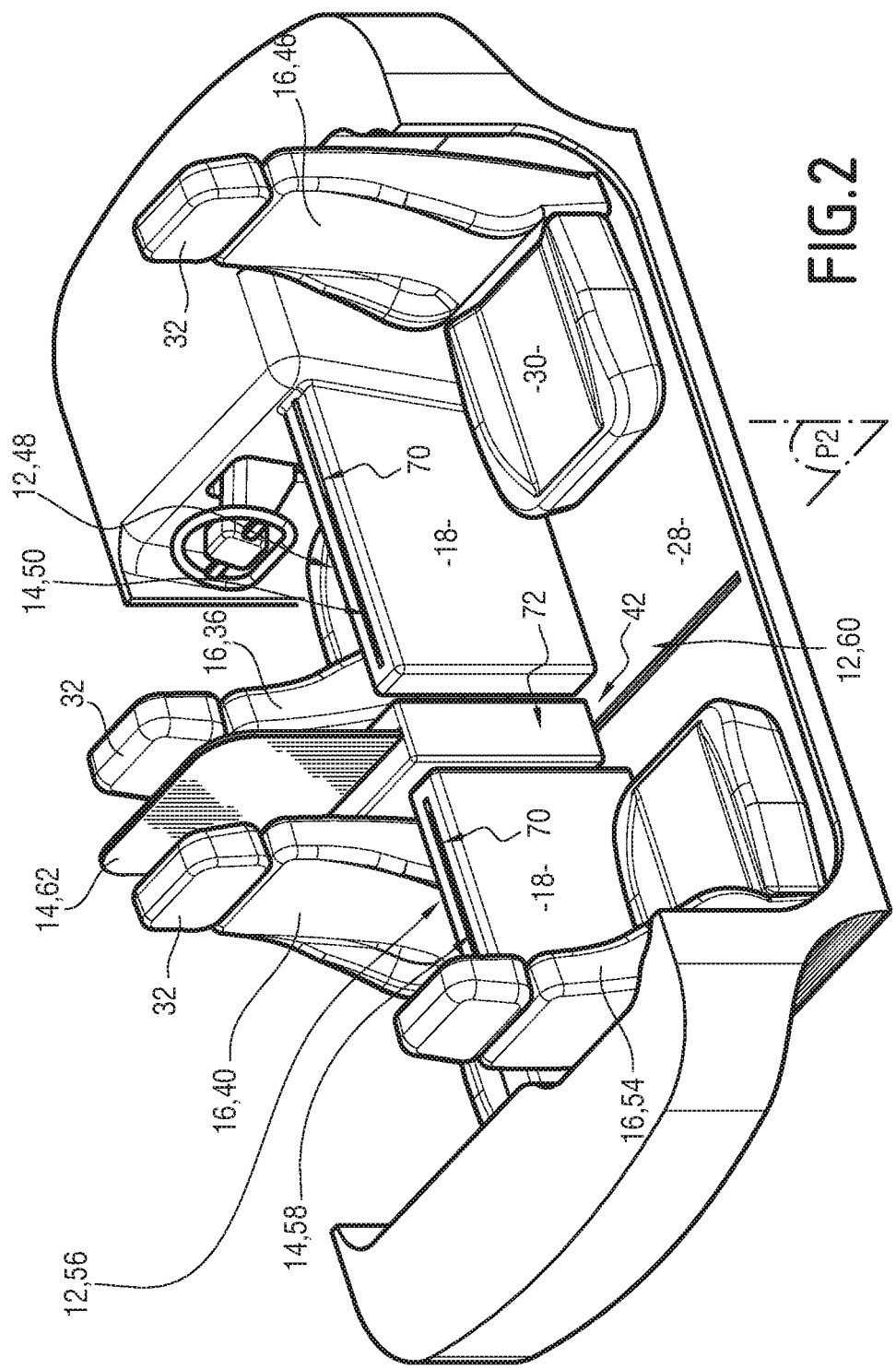
FIG. 2 is a schematic perspective illustration of the passenger compartment of FIG. 1, each separating panel being in the retracted position.
Figure 3:
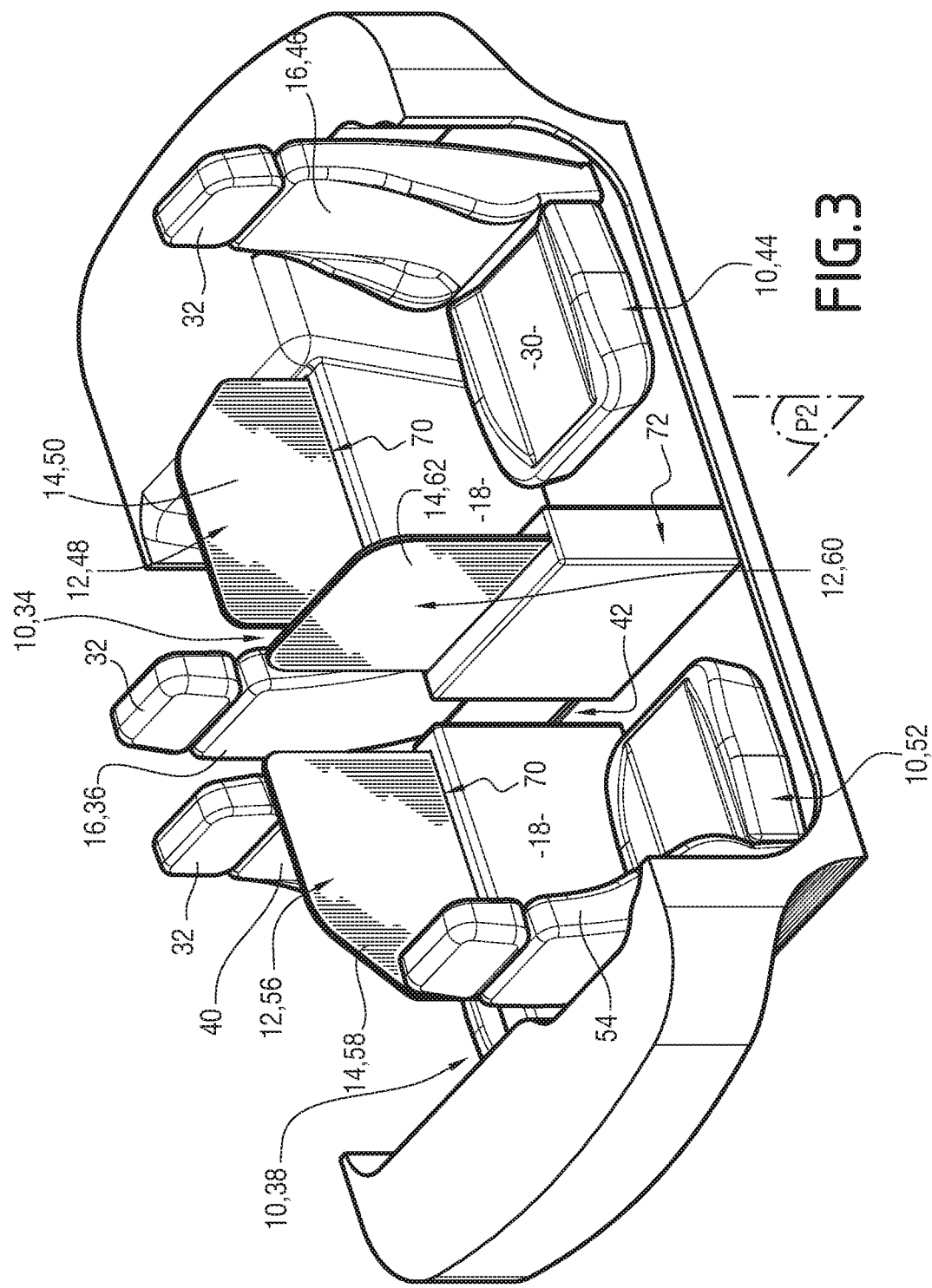
FIG. 3 is a schematic perspective illustration similar to FIG. 1, each separating panel being in the deployed position.

The passenger compartment 1 shown in FIGS. 1 to 3 is a vehicle passenger compartment, in particular for a motor vehicle.

The vehicle is for example an autonomous or semi-autonomous vehicle. In this type of vehicle, control over the driving can be given away, at least during certain phases, to an automated system responsible for managing the critical functions related to the driving of the vehicle. To that end, the vehicle is equipped with different sensors, for example laser sensors, radars or cameras. The collected information is used to model one of the renderings of the vehicle in three dimensions and to identify the different elements making it up (for example, marking on the ground, signage, presence of pedestrian or building). All of the information then allows the vehicle to be guided while complying with traffic and safety rules.

These driving phases are called autonomous driving phases. The driver may be called upon to take back control of the vehicle when the conditions require it, for example when exiting the expressway, in heavy traffic or in case of emergency situation. These driving phases are called manual driving phases. A manual driving phases may also the initiated voluntarily by the driver when he so wishes. Some vehicles may be completely autonomous and not provide any manual driving phase.

The motor vehicle passenger compartment 1 comprises a vehicle body 4 defining the general structure of the vehicle, and at least one opening part 6 of the vehicle. The passenger compartment 1 defines an inner area 8, surrounded by the body 4 and the opening part 6, in which the users of the vehicle are placed, such as the driver or the passengers.

The passenger compartment 1 defines at least three seating areas for users of the vehicle and at least one clear area 12 between two adjacent seating areas 10. Furthermore, the passenger compartment 1 comprises at least one separating panel 14 movable between a retracted position, illustrated in FIG. 2, and a deployed position, illustrated in FIG. 3.

When the panel 14 is in the retracted position, it extends outside each clear area 12. When the panel 14 is in the deployed position, it extends in at least one clear area 12, so as to separate the two associated adjacent seating areas 10.

Advantageously, each seating area 10 comprises at least one seat 16.

Furthermore, in the illustrated embodiment, the passenger compartment 1 includes a center console 18 extending at least between two adjacent seating areas 10.

In the illustrated example, the passenger compartment 1 has a first side 20 and a second side 22. The first side 20 and the second side 22 are separated by a longitudinal plane P1.

The first side 20 is for example defined as being the side of the driver's seat 36. The first side 20 is for example the left side for vehicles registered in France, the United States or China, or the right side for vehicles registered in England or India, for example.

The passenger compartment 1 further has a front row 24 and a back row 26. The driver's seat 16 is located in the front row 24. The front row 24 and the back row 26 are separated by a transverse plane P2 substantially perpendicular to the longitudinal plane P1.

The body 4 defines a floor, walls and a ceiling, defining the inner area 8 between them. Furthermore, the body 4 defines, in at least one of its walls, at least one opening 28 for access to the inner area 8, visible in FIG. 4.

In one example, the body 4 defines an opening 28 on each side wall.

The opening part 6 of the vehicle is movable relative to the body 4, between a position closing off the opening 28 and an open position in which the opening part allows access to the inner area 8. Each seat 16 advantageously comprises a seat bottom 30 and a seat back 32. The seat bottom 30 is defined in a substantially horizontal plane. Each seat back 32 is extended in a seat back plane. For example, the plane of the seat 32 is substantially vertical, when a passenger is seated in the seat. In one example, the seat back 32 of a seat is advantageously able to be inclined.

Advantageously, the seat back 32 of a seat 16 is able to be folded down, i.e., the seat back 32 can be pivoted to be folded down on the seat bottom 30 so as to free an additional space in the passenger compartment.

Hereinafter, the direction in which a seat 16 is turned is the direction in which the torso of a passenger seated on the seat bottom 30, and with his back pressed against the seat back 32, would face. For example, when one says that a seat 16 is facing forward, this means that its seat back is located toward the rear of the seat bottom.

A clear area 12 between two adjacent seating areas 10 is defined as being an area by which, when the seats 16 of the adjacent seating areas 10 are occupied, passengers seated on the associated seats 16, with their backs pressed against the seat backs, can see one another, in a normal position. "In a normal position" means that the passengers would not have to turn their head by more than 90° relative to the normal of the seat back of their seat 16 to see one another.

In other words, the clear area 12 is an area extending between two adjacent seating areas 10 in which two passengers can simply interact with one another.

In the example shown in FIGS. 1 to 3, the vehicle includes four seating areas 10, three clear areas 12 and three separating panels 14. In the example, one seat 16 is positioned per seating area 10. In the example, each panel 14 is associated with a clear area between two adjacent seating areas.

A first seating area 34 is located on the first side 20 in the front row 24. A first seat 36 arranged in the first seating area 34 is the driver's seat. This first seat 36 faces the front of the vehicle, i.e., faces the windshield.

A second seating area 38 is located on the first side 20 in the back row 26. A second seat 40 is arranged in the second seating area 38. The second seat 40 is positioned behind the first seat 36.

The second seat 40 faces the rear, in a "back to the road" position. Such a "back to the road" position can be preferred for safety reasons or comfort reasons, for example for young children.

Furthermore, the second seat 40 is turned back to back relative to the first seat 36. Thus, the passenger of the second seat and the driver do not see one another under normal operating conditions of the vehicle. There is therefore no clear area between the first seat and the second seat within the meaning of this application.

The first seat 36 and the second seat 40 delimit a receiving area 42 between them. The receiving area 42 is defined between the seat back 32 of the first seat 36 and the seat back 32 of the second seat 40. The dimensions of the receiving area 42 are adapted so that a separating panel 14, 62 can be introduced into the receiving area 42.

A third seating area 44 is located on the second side 22 in the front row 24. A third seat 46 is arranged in the third seating area 44. The third seat 46 faces the rear.

The third seat 46 being in the same row 24 as the first seat 36, the passenger of the third seat 46 and the passenger of the first seat 36 are side-by-side and can see one another, during normal operation, when the seats 36, 46 are occupied, if the associated panel 14 is in the retracted position. Thus, a first clear area 12, 48 is defined between the first seat 36 and third seat 46. The panel 14 associated with the first clear area 48 is called first panel 50.

In this arrangement, it is not necessary to provide, in the dashboard, an inflatable cushion of the airbag type for the passenger occupying the third seat 46, since the back rest 32 of the third seat 46 provides protection.

A fourth seating area 52 is located on the second side 22 in the back row 26. A fourth seat 54 is arranged in the fourth seating area 52. The fourth seat 54 faces the front.

The fourth seat 54 being in the same row 26 as the second seat 40, the passenger of the fourth seat 54 and the passenger of the second seat 40 are side-by-side and can see one another, during normal operation, when the seats 40, 54 are occupied, if the associated panel 14, 58 is in the retracted position. Thus, a second clear area 12 is defined between the second seat 40 and the fourth seat 54. The panel 14 associated with the second clear area 56 is called second panel 58.

Furthermore, the third seat 46 and the fourth seat 54 are located on the same side 22 and face one another. The passenger of the third seat 46 and the passenger of the fourth seat 54 can therefore see one another during normal operation, when the seats 46, 54 are occupied, if the associated panel 14, 62 is in the retracted position. Thus, a third clear area 60 is defined between the third seat 46 and the fourth seat 54. The panel 14 associated with the third clear area 60 is called third panel 62.

However, the third area 44 and the second area 38 are not adjacent. Furthermore, in order to see the passenger of the third seat 46, the passenger of the second seat 40 must turn his head by more than 90° relative to the longitudinal direction. There is therefore no clear area 12 between the third seat 46 and the second seat 40 within the meaning of this application.

Likewise, there is no clear area between the first seat 36 and the fourth seat 54 within the meaning of this application. Thus, when the driver is seated in his seat 36, in the first seating area 34, he can see the passenger who is next to him, in the third seating area 44, but no other passengers.

The center console 18 defines at least one housing 70, at least one separating panel 14, 50, 58 being received in the housing in its retracted position.

The center console 18 extends in the longitudinal plane P1.

The center console 18 extends across at least one of the rows among the front row 24 and the back row 26.

As shown in FIGS. 1 to 4, the console 18 traverses the front row 24 and the back row 26.

In the example illustrated in FIGS. 1 to 3, the center console 18 extends between the first seating area 34 and the third seating area 44 and between the second seating area 38 and the fourth seating area 52.

In the illustrated example, the center console 18 defines two housings 70. One housing 70 receives the first separating panel 50 in its retracted position, and the other housing 70 receives the second separating panel 58 in its retracted position.

Furthermore, the center console 70 comprises a passage 72 for the third separating panel 62 between its retracted position and its deployed position.

Each separating panel 14, 50, 58, 62 is capable of forming a partition between two adjacent seating areas 10, in the deployed position.

For example, the first separating panel 50 limits the transfer of objects between the first seating area 34 and the third seating area 44.

Each separating panel 14, 50, 58, 62 has a first substantially planar face and a second substantially planar face parallel to the first face. Each separating panel 14, 50, 58, 62 extends between a lower edge, facing the floor of the vehicle, and an upper edge, facing the ceiling of the vehicle. Furthermore, each separating panel 14, 50, 58, 62 extends laterally between two side edges.

The thickness of a separating panel 14, 50, 58, 62 is relatively small compared to its height and the distance between its side edges.

The separating panel 14, 50, 58, 62 is rigid enough to prevent an object of non-negligible mass, for example having a mass greater than 100 g, from passing between the two adjacent seating areas 10 when it is in the deployed position.

The separating panel 14, 50, 58, 62 is for example made from plastic.

In one example, each separating panel 14, 50, 58, 62 has sound absorption characteristics making it possible to limit the sound coming from an adjacent area 10.

The panel is for example translucent. Translucent refers to a body transmitting light by refraction or in a diffuse manner. For example, the translucence of the separating panel 14, 50, 58, 62 is suitable for blurring the objects contained in the adjacent seating area 10. A passenger therefore cannot distinguish the objects by looking through the separating panel 14, 50, 58, 62.

Alternatively, the separating panel 14, 50, 58, 62 is transparent. Thus, the panel separates the seating areas 10 without obstructing passengers' view.

Alternatively, a separating panel 14, 50, 58, 62 is opaque, i.e., it does not allow visible light to pass.

The separating panel 14, 50, 58, 62 advantageously comprises at least one additional module, such as a light source, a speaker, a screen, a cupholder, a storage pocket and/or a retractable tray.

Advantageously, the additional modules are positioned on both faces of the panel 14, 50, 58 so that each passenger in an associated seating area 10 can benefit from them when the panel 14, 50, 58, 62 is in the deployed position.

For example, the panel 14, 50, 58, 62 comprises light sources. For example, the panel 14, 50, 58, 62 comprises speakers.

Advantageously, the separating panel 14, 50, 58, 62 comprises at least one screen. For example, the separating panel 62 comprises two screens, one screen being visible by a passenger occupying the third seat 46 and the other by a passenger occupying the fourth seat 54, when the third panel 62 is in the deployed position.

When the first panel 50 is in the retracted position, it extends in the housing 70 of the center console 18 that is between the first seating area 34 and the third seating area 44. Thus, the first panel 50 is located outside each clear area 12 in the retracted position.

When the first panel 50 is in the deployed position, it extends in the first clear area 48, so as to separate the first seating area 34 and the third seating area 44.

The separating assembly formed by the first panel 50 and the center console 18 extends from the floor to the ceiling of the vehicle when the first panel 50 is in the deployed position.

Alternatively, the separating assembly formed by the first panel 50 and the center console 18 has a height comprised between 40% and 90% of the height between the floor and the ceiling, when the first panel 50 is in the deployed position.

The first panel 50 is translatable, in the longitudinal plane P1, advantageously in a substantially vertical direction. For example, the first separating panel 50 is mounted movably in the housing using lateral guides on which these side edges slide.

Likewise, when the second panel 58 is in the retracted position, it extends completely in the housing 70 of the center console 18 that is between the second seating area 38 and the fourth seating area 52. Thus, the second panel 58 is located outside each clear area 12 in the retracted position. When the second panel 58 is in the deployed position, it extends in the second clear area 56, so as to separate the second seating area 38 and the fourth seating area 52.

The separating assembly formed by the second panel 58 and the center console 18 extends partially or completely from the floor to the ceiling of the vehicle when the second panel 58 is in the deployed position.

The second panel 58 is translatable, in the longitudinal plane P1 in a substantially vertical direction. For example, the second separating panel 58 is mounted movably in the housing using lateral guides on which these side edges slide.

When the third panel 62 is in the retracted position, it extends in the housing 70 of the receiving area 42 that is between the first seat 36 and the second seat 46. Thus, the third panel 62 is located outside each clear area 12 in the retracted position.

When the third panel 62 is in the deployed position, it extends in the third clear area 48, so as to separate the third seating area 44 and the fourth seating area 52.

The separating assembly formed by the third panel 62 extends from the floor to the ceiling of the vehicle.

The third panel 62 is mounted translatable in the transverse plane P2, for example in a deployment direction substantially perpendicular to the longitudinal plane. For example, the third separating panel 62 is mounted movably between the deployed position and the retracted position using a lower guide on which its lower edge slides.

Furthermore, the third panel 62 has dimensions suitable for being able to enter the passage 72 of the center console 18, when it moves between the retracted position and the deployed position.

Advantageously, each panel comprises a locking system for keeping it in the deployed position and a locking system for keeping it in the retracted position.

Furthermore, advantageously, each panel comprises a driving device for actuating the change of position.

For example, the movement of the panels between the retracted position and the deployed position is electric, alternatively is manual or semi-automatic.

For example, the deployment of the panels is synchronized to be done after the installation of passengers or the driver.

Thus, each panel can be retractable, which allows easy access from one area to another when the panel is retracted and isolation when the panel is deployed.

Such a vehicle with retractable separating panels 14, 50, 58, 62 can be useful for vehicles used for car sharing, each seating area 10 being easy to isolate using the separating panels 14, 50, 58, 62.

Furthermore, access to the vehicle is made easier when the panels are in the retracted position. This may in particular facilitate access through the opening 28 or facilitate loading of bulky objects.

For example, when the third seat 46 is not occupied, it is possible to fold down the seat back 32, if the third panel 62 is in the retracted position. When the seat back 32 of the third seat 46 is folded down, the driver's lateral field of view is increased. Furthermore, the continuous space accessible from the inner area 8 is increased. This can for example be interesting to transport a bulky object, such as a board.

The invention is not limited to the above embodiments.

For example, the number and arrangement of the seats is different.

In one example, at least one seat 16 is mounted pivoting, i.e., the direction in which the seat 16 is facing can be modified. When the orientation of the seats 16 relative to one another is modified, the clear area 12 between two adjacent seating areas 10 varies based on the orientation of the seats 16.

Figure 4:
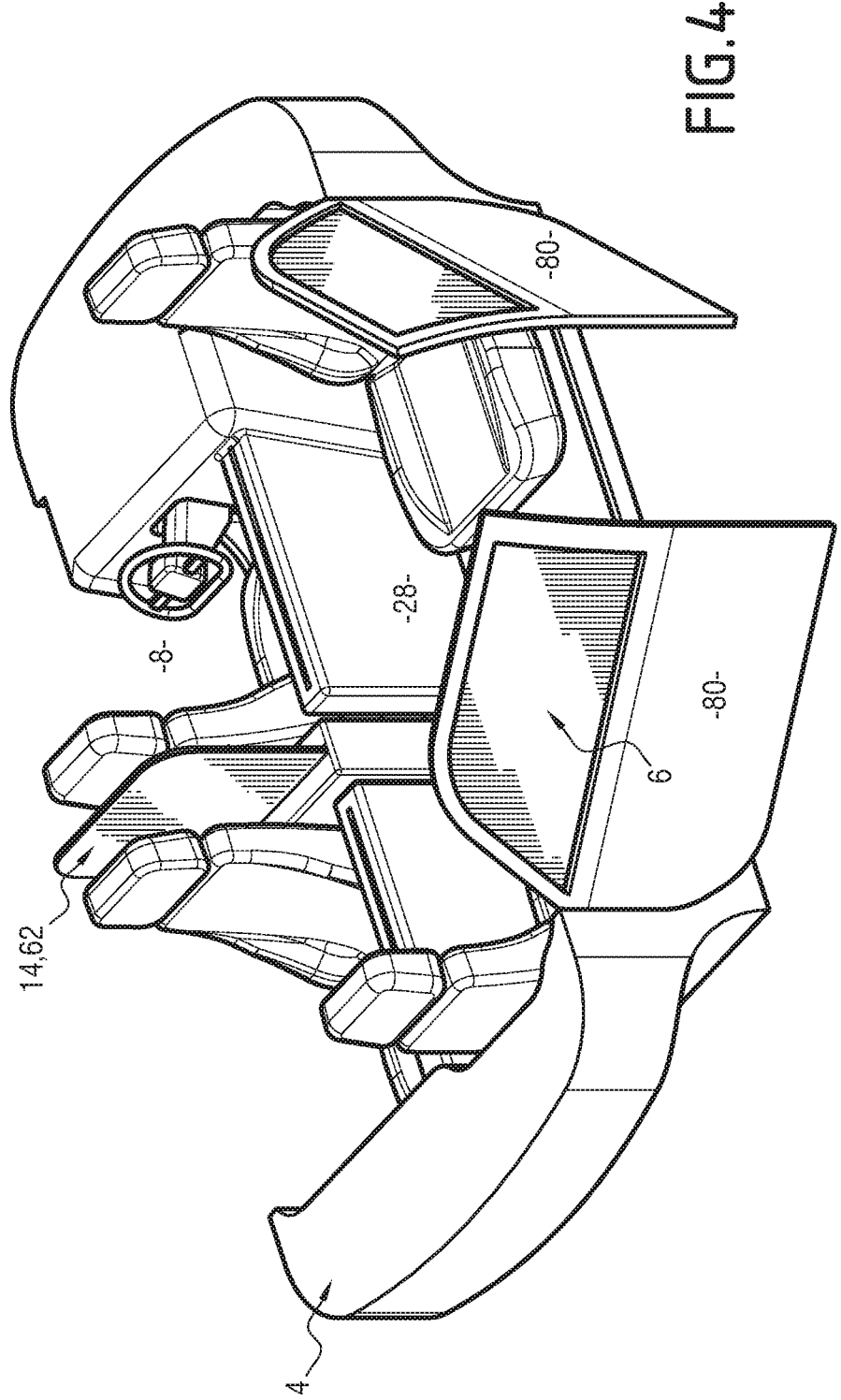
FIG. 4 is a schematic illustration of a vehicle according to an embodiment of the invention.

In the example shown in FIG. 4, the opening 28 has large enough dimensions to allow the installation of a passenger both in the front row 24 and in the back row 26. For example, the opening part 6 includes two movable leaves 80, the rotation axes of which are fixed on the edges of the opening 28. This makes it possible to further increase the space accessible from the inner area 8.

Furthermore, each panel 14, 50, 58, 62 can advantageously be placed in an intermediate position between the retracted position and the deployed position.

Another embodiment is described below (not illustrated in the figures). This embodiment is described only by difference with respect to the embodiment described with reference to FIGS. 1 to 4.

The center console 18 only extends through the front row 24.

In this case, the center console 18 extends between the first seating area 34 and the third seating area 44.

The center console 18 defines a single housing. The housing receives a separating panel in its retracting position.

Another separating panel of the vehicle compartment is mounted translatable in the transverse plane P2, for example in a deployment direction substantially perpendicular to the longitudinal plane P1.

The other separating panel is mounted translatable behind the center console 18 with respect to the front side of the vehicle, i.e. the transverse plane P2 extends on the rear side of the center console 18.

The other separating panel is mounted movably in the deployment direction between the deployed position and the retracted position.

When the other separating panel is in the retracted position, it extends in the receiving area 42 defined between the first seat 36 and the second seat 40. Thus, the other separating panel is located outside each clear area 12 in the retracted position.

When the other separating panel is in the deployed position, it extends in the clear area defined between the third seat 46 and the fourth seat 54, so as to separate the third seating area 44 and the fourth seating area 52.

For example, the other separating panel is mounted movably between the deployed position and the retracted position using a lower guide on which its lower edge slides.

Yet another embodiment is described below (not illustrated in the figures). This embodiment is described only by difference with respect to the embodiment described with reference to FIGS. 1 to 4.

The center console 18 only extends across the rear row 26.

In this case, the center console 18 extends between the second seating area 38 and the fourth seating area 52.

The center console 18 defines a single housing. The housing receives a separating panel in its retracting position.

Another separating panel of the vehicle housing is mounted translatable in the transverse plane P2, for example in a deployment direction substantially perpendicular to the longitudinal plane P1.

The other separating panel is mounted translatable in front of the center console 18 with respect to the front side of the vehicle, i.e. the transverse plane P2 extends on the front side of the center console 18. The other separated panel is mounted movably in the deployment direction between the deployed position and the retracted position.

When the other separating panel is in the retracted position, it extends in the receiving area 42 defined between the first seat 36 and the second seat 40. Thus, the other separating panel is located outside each clear area 12 in the retracted position.

When the other separating panel is in the deployed position, it extends in the clear area defined between the third seat 46 and the fourth seat 54, so as to separate the third seating area 44 and the fourth seating area 52.

For example, the other separating panel is mounted movably between the deployed position and the retracted position using a lower guide on which its lower edge slides.

The invention claimed is:

1. A vehicle passenger compartment having at least three seating areas and at least two clear areas, each clear area being located between two adjacent seating areas, wherein the passenger compartment comprises at least two separating panels, each separating panel being movable between a first position in which the separating panel extends outside each clear area and a second position in which the separating panel extends in at least one clear area, so as to separate the two associated adjacent seating areas,
    wherein the passenger compartment has a first side and a second side, separated by a longitudinal plane, and has a front row and a back row, separated by a transverse plane substantially perpendicular to the longitudinal plane,
    wherein the passenger compartment comprises a center console extending in the longitudinal plane, the center console extending between two adjacent seating areas and defining at least one housing, one of the separating panels being received in the housing in its first position, and
    another of the separating panels being mounted translatable in the transverse plane in a deployment direction substantially perpendicular to the longitudinal plane, and being mounted movably in the deployment direction between its first position and its second position.

2. The vehicle passenger compartment according to claim 1, wherein the passenger compartment has a first seating area being located on the first side in the front row, a second seating area being located on the first side in the back row, a third seating area being located on the second side in the front row, a fourth seating area being located on the second side in the back row, a first clear area extending between the first seating area and the second seating area, a second clear area extending between the second seating area and the fourth seating area and a third clear area extending between the third seating area and the fourth seating area.

3. The vehicle passenger compartment according to claim 1, comprising:
    a first seat arranged in a first seating area, and
    a second seat arranged in a second seating area, the first seat and the second seat being turned back to back relative to one another, the first seat and the second seat delimiting a receiving area between them, one of the separating panels being received in the receiving area in its first position.

4. The vehicle passenger compartment according to claim 3, comprising:
    a third seat arranged in a third seating area, and
    a fourth seat arranged in a fourth seating area, the third seat and the fourth seat facing one another, one of the separating panels extending, in its second position, in the clear area between the third seat and the fourth seat.

5. The vehicle passenger compartment according to claim 1, comprising:
    a third seat arranged in a third seating area, and
    a fourth seat arranged in a fourth seating area, the third seat and the fourth seat facing one another, one of the separating panels extending, in its second position, in the clear area between the third seat and the fourth seat.

6. The vehicle passenger compartment according to claim 1, wherein the transverse plane extends on a rear side or on a front side of the center console.

7. The vehicle passenger compartment according to claim 1, wherein the center console comprises a passage, the other separating panel moving in the passage, between its first position and its second position.

8. The vehicle passenger compartment according to claim 1, wherein at least one of the separating panels is translucent.

9. The vehicle passenger compartment according to claim 1, wherein at least one of the separating panels comprises at least one screen.

10. An autonomous or semi-autonomous vehicle comprising the vehicle passenger compartment set forth in claim 1.

11. A vehicle passenger compartment having at least three seating areas and at least two clear areas, each clear area being located between two adjacent seating areas, wherein the passenger compartment comprises at least two separating panels, each separating panel being movable between a first position in which the separating panel extends outside each clear area and a second position in which the separating panel extends in at least one clear area, so as to separate the two associated adjacent seating areas,
    wherein the passenger compartment has a first side and a second side, separated by a longitudinal plane, and has a front row and a back row, separated by a transverse plane substantially perpendicular to the longitudinal plane, a first seating area being located on the first side in the front row, a second seating area being located on the first side in the back row, a third seating area being located on the second side in the front row, a fourth seating area being located on the second side in the back row, a first clear area extending between the first seating area and the second seating area, a second clear area extending between the second seating area and the fourth seating area and a third clear area extending between the third seating area and the fourth seating area.

12. A vehicle passenger compartment having at least three seating areas and at least two clear areas, each clear area being located between two adjacent seating areas, wherein the passenger compartment comprises at least two separating panels, each separating panel being movable between a first position in which the separating panel extends outside each clear area and a second position in which the separating panel extends in at least one clear area, so as to separate the two associated adjacent seating areas, and wherein the passenger compartment has a first side and a second side, separated by a longitudinal plane, and has a front row and a back row, separated by a transverse plane substantially perpendicular to the longitudinal plane, a first seating area being located on the first side in the front row, a second seating area being located on the first side in the back row, a third seating area being located on the second side in the front row, a fourth seating area being located on the second side in the back row, a first clear area extending between the first seating area and the third seating area, a second clear area extending between the second seating area and the fourth seating area and a third clear area extending between the third seating area and the fourth seating area.

\* \* \* \* \*